US012397470B2

(12) United States Patent
Gürel et al.

(10) Patent No.: US 12,397,470 B2
(45) Date of Patent: Aug. 26, 2025

(54) COMPACT COMBUSTION CHAMBER MOLD FOR A CIRCULATING FLUIDIZED BED BOILER AND A METHOD OF OBTAINING A COMBUSTION CHAMBER WITH THIS MOLD

(71) Applicant: SÜLEYMAN DEMIREL ÜNIVERSITESI IDARI VE MALI ISLER DAIRE BASKANLIGI GENELSEKRETERLIK, Isparta (TR)

(72) Inventors: Bariş Gürel, Isparta (TR); Karani Kurtulus, Isparta (TR); Habib Gürbüz, Isparta (TR); Sema Yurdakul, Isparta (TR); Murat Varol, Isparta (TR); Remzi Akman, Isparta (TR); Muhammet Enes Önür, Isparta (TR)

(73) Assignee: SÜLEYMAN DEMIREL ÜNIVERSITESI IDARI VE MALI ISLER DAIRE BASKANLIGI GENELSEKRETERLIK, Isparta (TR)

( * ) Notice: Subject to any disclaimer, the term of this patent is extended or adjusted under 35 U.S.C. 154(b) by 0 days.

(21) Appl. No.: 18/681,784

(22) PCT Filed: Dec. 29, 2022

(86) PCT No.: PCT/TR2022/051675
§ 371 (c)(1),
(2) Date: Feb. 6, 2024

(87) PCT Pub. No.: WO2024/049370
PCT Pub. Date: Mar. 7, 2024

(65) Prior Publication Data

US 2025/0135681 A1 May 1, 2025

(30) Foreign Application Priority Data

Aug. 29, 2022 (TR) ................................ 2022/013543

(51) Int. Cl.
*B28B 7/00* (2006.01)
*B28B 1/54* (2006.01)
(Continued)

(52) U.S. Cl.
CPC ................ *B28B 7/168* (2013.01); *B28B 1/54* (2013.01); *F23G 5/30* (2013.01)

(58) Field of Classification Search
None
See application file for complete search history.

(56) References Cited

U.S. PATENT DOCUMENTS 3,186,387 A 6/1965 Kolbe et al.
4,416,621 A * 11/1983 Huther .................... F23R 3/007 60/753
(Continued)

FOREIGN PATENT DOCUMENTS

CN 108087885 A * 5/2018 ............. F23G 5/027
CN I 4515818 A 5/2022
(Continued)

OTHER PUBLICATIONS

International Search Report and Written Opinion for International Application No. PCT/TR2022/051675, mailing date of Jun. 12, 2023.

*Primary Examiner* — Yung-Sheng M Tsui
(74) *Attorney, Agent, or Firm* — Fresh IP PLC; Clifford D. Hyra; Aubrey Y. Chen

(57) ABSTRACT

Disclosed herein is a compact (e.g., one-piece) refractory cast iron combustion chamber mold for a circulating fluidized bed boiler for the combustion and/or gasification of biomass, waste, lignite and mixtures thereof, and a method of obtaining a combustion chamber with this mold.

10 Claims, 6 Drawing Sheets

(51) Int. Cl.

| | |
|---|---|
| ***B28B 7/16*** | (2006.01) |
| *F23G 5/30* | (2006.01) |

(56) References Cited

U.S. PATENT DOCUMENTS

| | | | |
|---|---|---|---|
| 4,938,183 | A | 7/1990 | Field et al. |
| 2001/0003226 | A1 | 6/2001 | Schreiber et al. |

FOREIGN PATENT DOCUMENTS

| | | | | |
|---|---|---|---|---|
| JP | H07227819 | A | * | 8/1995 |
| KR | 20040073891 | A | | 8/2004 |

* cited by examiner

COMPACT COMBUSTION CHAMBER MOLD FOR A CIRCULATING FLUIDIZED BED BOILER AND A METHOD OF OBTAINING A COMBUSTION CHAMBER WITH THIS MOLD

FIELD

The present disclosure relates to a compact refractory cast iron combustion chamber mold for a circulating fluidized bed boiler for combustion and/or gasification of biomass, waste, lignite, and mixtures of them, having inlets for primary stage air nozzles, ash removal, biomass and lignite feed, secondary stage air, burner and burner cooling air and return from the seal pot, and a method of obtaining a combustion chamber with this mold.

BACKGROUND

The present disclosure relates to the design and manufacture of the combustion chamber, which is the most important component in the power plants that produce energy by burning lignite and biomass in the energy sector, which is one of the biggest needs of the developing world, in a compact single piece and manufactured from cast refractory. The energy conversion systems that meet energy needs are often thermal power plants that produce energy by burning fossil fuels and biomass power plants that produce energy by burning biomass. Circulating fluidized bed boiler systems are the most efficient and environmentally friendly systems that can burn biomass and lignite. In addition, circulating fluidized bed boiler systems are the most efficient combustion technology that can be used to burn low quality fuels with high moisture and ash contents and a lower heating value. In this respect, developments in circulating fluidized bed boiler systems are very important for the energy sector both nationally and internationally.

It is a very laborious and long-lasting process to manufacture the combustion chamber of the circulating fluidized bed boiler systems currently used in the market in accordance with the actual operating conditions. Primary stage air nozzles, ash removal, biomass and lignite feed, secondary stage air and burner and burner cooling air and return inlets from the seal pot are designed, manufactured and installed separately in the combustion chamber. Seal pots are structures that allow the sand to be cooled without leaking back sand and work just like a reservoir siphon. Due to this situation, there are great difficulties and manufacturing of such equipment is based on years of tedious experience through trial and error. Due to this situation, developing countries such as Turkey import circulating fluidized bed boiler systems for large capacity thermal and biomass power plants.

When various combustion chamber productions in the world are investigated, it is seen that the design of the circulating fluidized bed boiler is firstly created and the outer shell of it is manufactured from a thick sheet steel, then thermal insulation material and refractory brick are applied into the combustor respectively. In these cases, it is very difficult to create the ports and design details from these materials.

When another method is examined, it is seen that anchorages are filled between the inner and outer mold sheets and refractory concrete is poured at the application site and made separately. After the manufacturing is completed, annealing with burners is required. In the cases mentioned, it is very difficult, laborious and requires many years of experience to create the entrances and design details from these materials.

In the state of the art, the application validated in Turkey with application number TR 2022/000826 from document EP3390909 B1 with publication number EP3390909 B1 refers to a compact burner having a fuel and combustible air regeneration. The invention is a compact combustion chamber having a fuel and combustion air renewal (11) comprising: a refractory block (12), a metallic body (13) of the burner internally coated with an insulating refractory layer (14) and an ignition device (15) having flame detection, wherein said refractory block (12) is positioned directly facing a combustion chamber of a furnace, wherein said metallic body (13) of the burner, comprising a pair of regeneration units (16, 17) both coated with said insulating refractory layer (14), further provided is an intermediate refractory block (33) separating said pair of regeneration units (16, 17) and cooperating with said refractory block (12) so as to be sealable, said pair of regeneration units, comprising an air regeneration unit (16) and a fuel regeneration unit (17) integrated with each other and supported in said metallic body (13), both of said air regeneration unit (16) and said fuel regeneration unit (17) being connected to a single combustion front chamber of the burner (29) positioned in said refractory block (12), wherein the combustion front chamber of said burner (29) is also the combustion front chamber, said ignition device (15) having a flame sensing device placed between said two units (16, 17), wherein said air regeneration unit (16) and said fuel regeneration unit (17) are connected to said pre-combustion chamber of the burner (29) via at least one respective intermediate channel (30, 31) positioned in said refractory block (12).

Consequently, an improvement has been necessary in the technical field due to the problems mentioned above and insufficiency of the present solutions about the matter.

SUMMARY

Embodiments of the invention aim to solve the abovementioned drawbacks.

At least one embodiment relates to a circulating fluidized bed boiler, a compact refractory cast iron combustion chamber with primary stage air nozzles, ash intake, biomass and lignite feed, secondary stage air, burner and burner cooling air and return inlets from seal pot that can be manufactured as a single piece.

In at least one embodiment, the sheet metals to be made inside and outside are connected with bolts. The sheet metals are opened as one piece and the anchoring metals are attached and the heat insulation material is first placed on the back of the outer metal and the inner and outer sheet is connected by connecting the bolts. After this stage, all holes and entrances are closed, refractory material is poured and baked between the insulation material and the inner sheet metal of the mold, and the refractory cast iron combustion chamber with all entrances is manufactured in one piece. Thus, a refractory cast iron combustion chamber of a circulating fluidized bed boiler will be manufactured in desired capacities in a short time.

One aim of at least one embodiment of the invention is to provide a one-piece (compact) refractory cast iron combustion chamber mold for circulating fluidized bed boiler, which enables the combustion and/or gasification of biomass, waste, lignite, and mixtures thereof, and a method of obtaining a combustion chamber with this mold. Compact (one-piece) manufacturing will allow easy adaptation to refractory cast iron combustion chamber designs of different capacities.

Another aim of at least one embodiment of the invention is to provide a combustion chamber mold with primary stage air nozzles, ash removal, biomass, and lignite feed, secondary stage air, burner and burner cooling air and seal pot return inlets, where these inlets are manufactured together rather than separately, and a method of obtaining a combustion chamber with this mold.

Another aim of at least one embodiment of the invention is to provide a combustion chamber mold and a method of obtaining a combustion chamber with this mold, in which sheet metals are connected with bolts to provide a one-piece structure.

Another aim of at least one embodiment of the invention is to provide a combustion chamber mold and a method of obtaining a combustion chamber with this mold, which, thanks to its one-piece structure, is suitable for real working conditions and is less laborious (labor saving) and shorter to manufacture than its counterparts. By manufacturing a compact refractory cast refractory combustion chamber, both time and labor will be saved during the manufacturing process.

Another aim of at least one embodiment of the invention is to provide a combustion chamber mold for a circulating fluidized bed boiler, which enables the production of refractory cast iron combustion chambers in high capacities in a short time, and a method of obtaining a combustion chamber with this mold.

Another aim of at least one embodiment of the invention is to provide a combustion chamber mold and a method of obtaining a combustion chamber with this mold, which will reduce manufacturing defects and thus provide economic gain due to its production in a single piece. Problems arising during 10 the manufacture and assembly of the combustion chamber components separately will be easily solved by compact manufacturing.

Another aim of at least one embodiment of the invention is to provide a combustion chamber mold with a high level of insulation performance using silica boron and a method of obtaining a combustion chamber with this mold.

Another aim of at least one embodiment of the invention is to provide a combustion chamber mold and a method of obtaining a combustion chamber with this mold, which eliminates the dependence on experience and believes in a standard production thanks to its production as a single piece.

FIGURES TO UNDERSTAND THE INVENTION

The structural and characteristic features and all advantages of the invention will be more clearly understood by means of the figures given below and the detailed description written with reference to these figures, and therefore, the evaluation should be made by taking these figures and detailed description into consideration.

DETAILED DESCRIPTION

Figure 1:
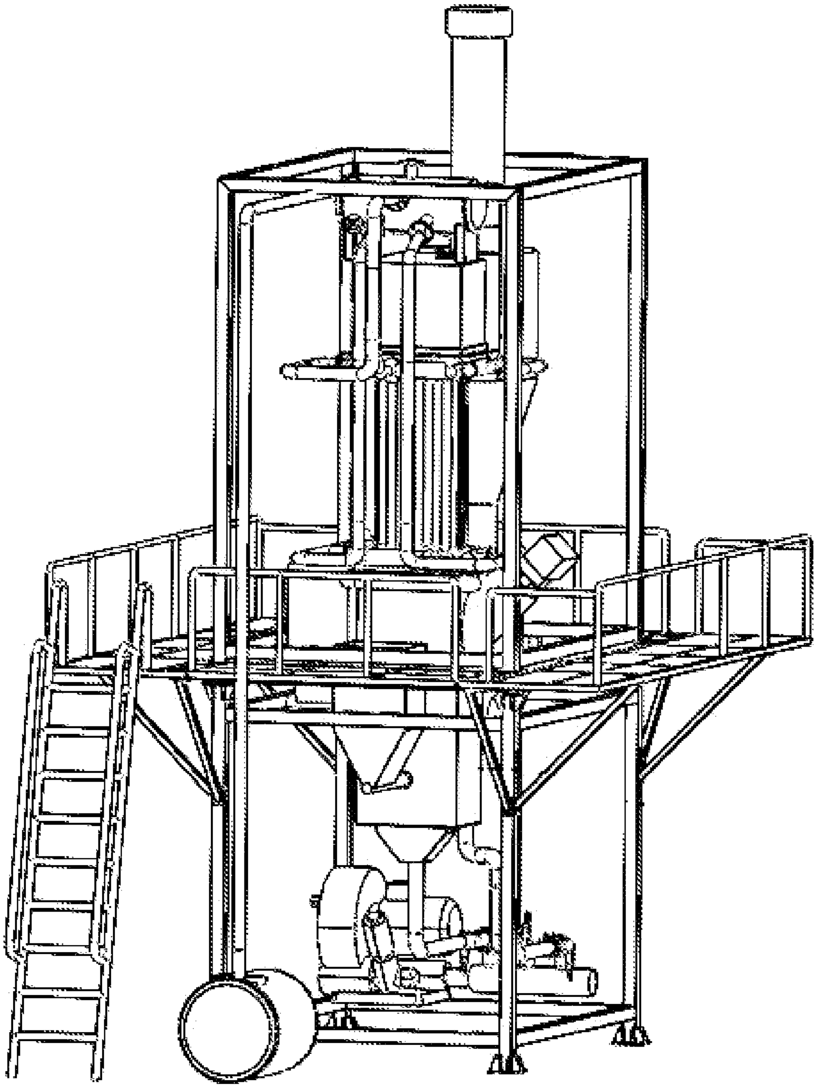
FIG. 1 is a view of a circulating fluidized bed boiler for combustion and/or gasification of biomass, waste, lignite, and mixtures thereof.
Figure 2:
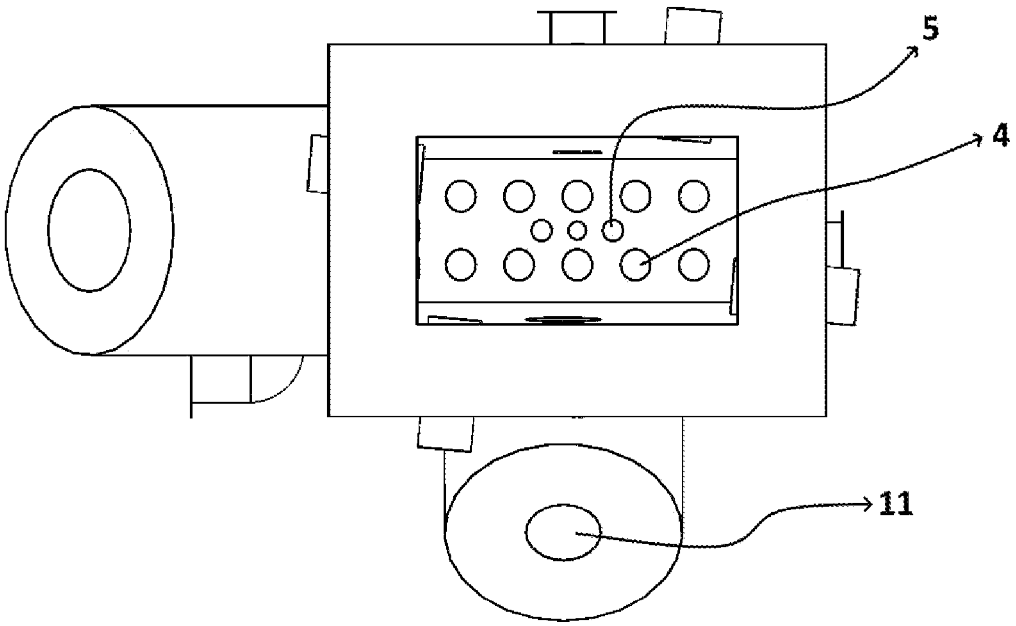
FIG. 2 is a representative cross-sectional top view of a one-piece refractory cast iron combustion chamber mold for a circulating fluidized bed boiler for the combustion and/or gasification of biomass, waste, lignite, and mixtures thereof, according to at least one embodiment of the invention.
Figure 3:
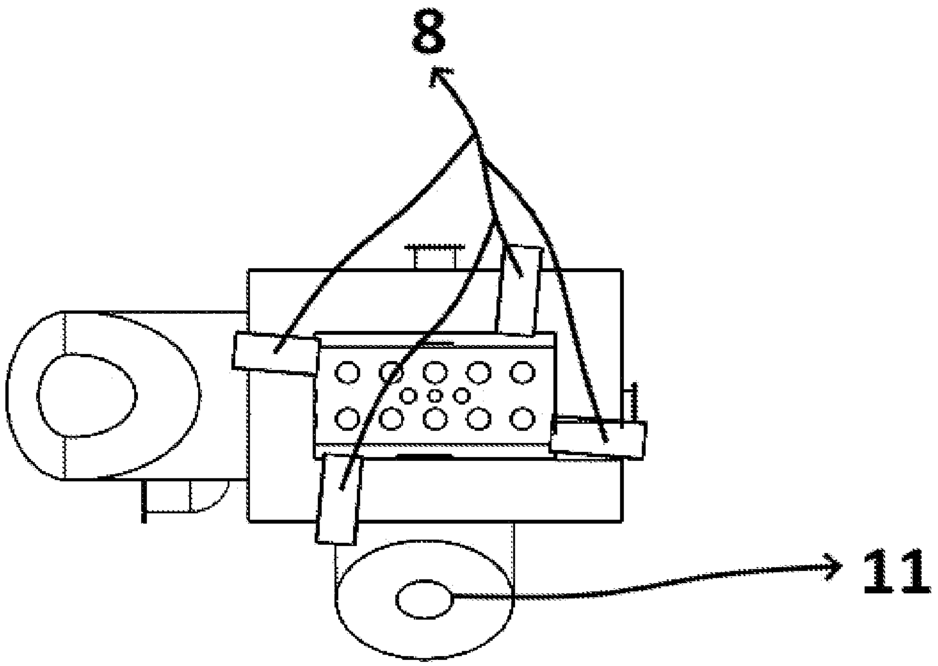
FIG. 3 is a representative cross-sectional view from the bottom of a one-piece refractory cast iron combustion chamber mold for a circulating fluidized bed boiler for the combustion and/or gasification of biomass, waste, lignite, and mixtures thereof, according to at least one embodiment of the invention.
Figure 4:
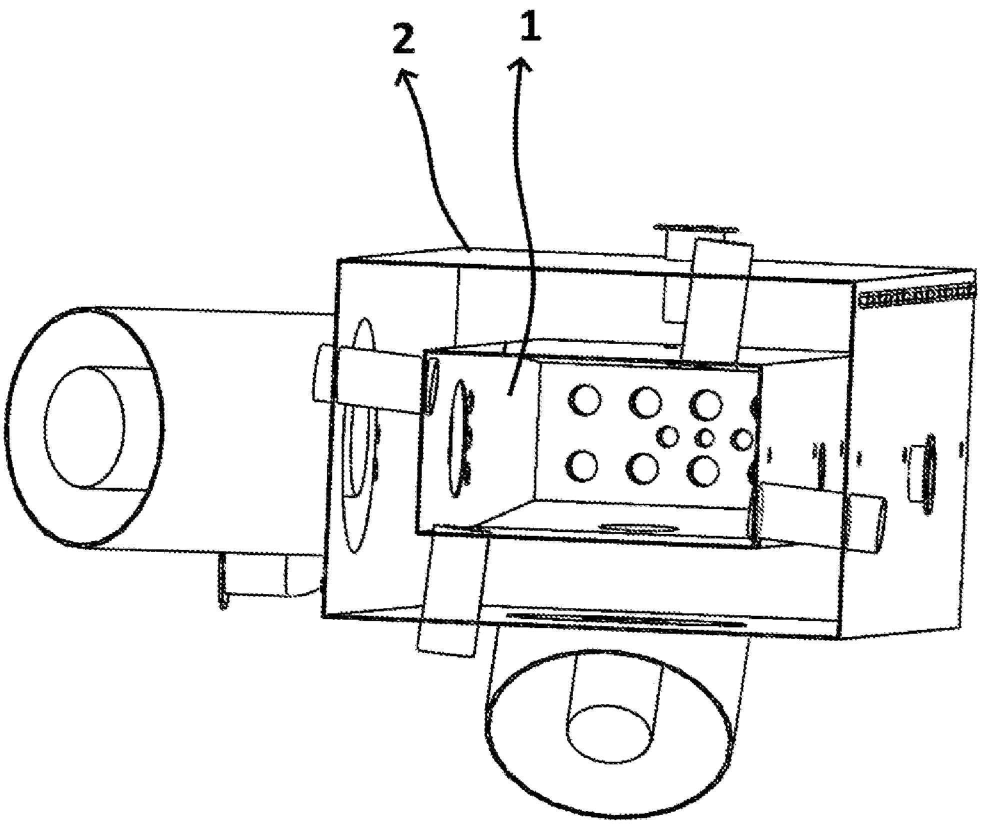
FIG. 4 is a representative perspective view from the bottom of a one-piece refractory cast iron combustion chamber mold for a circulating fluidized bed boiler for the combustion and/or gasification of biomass, waste, lignite, and mixtures thereof, according to at least one embodiment of the invention.
Figure 5:
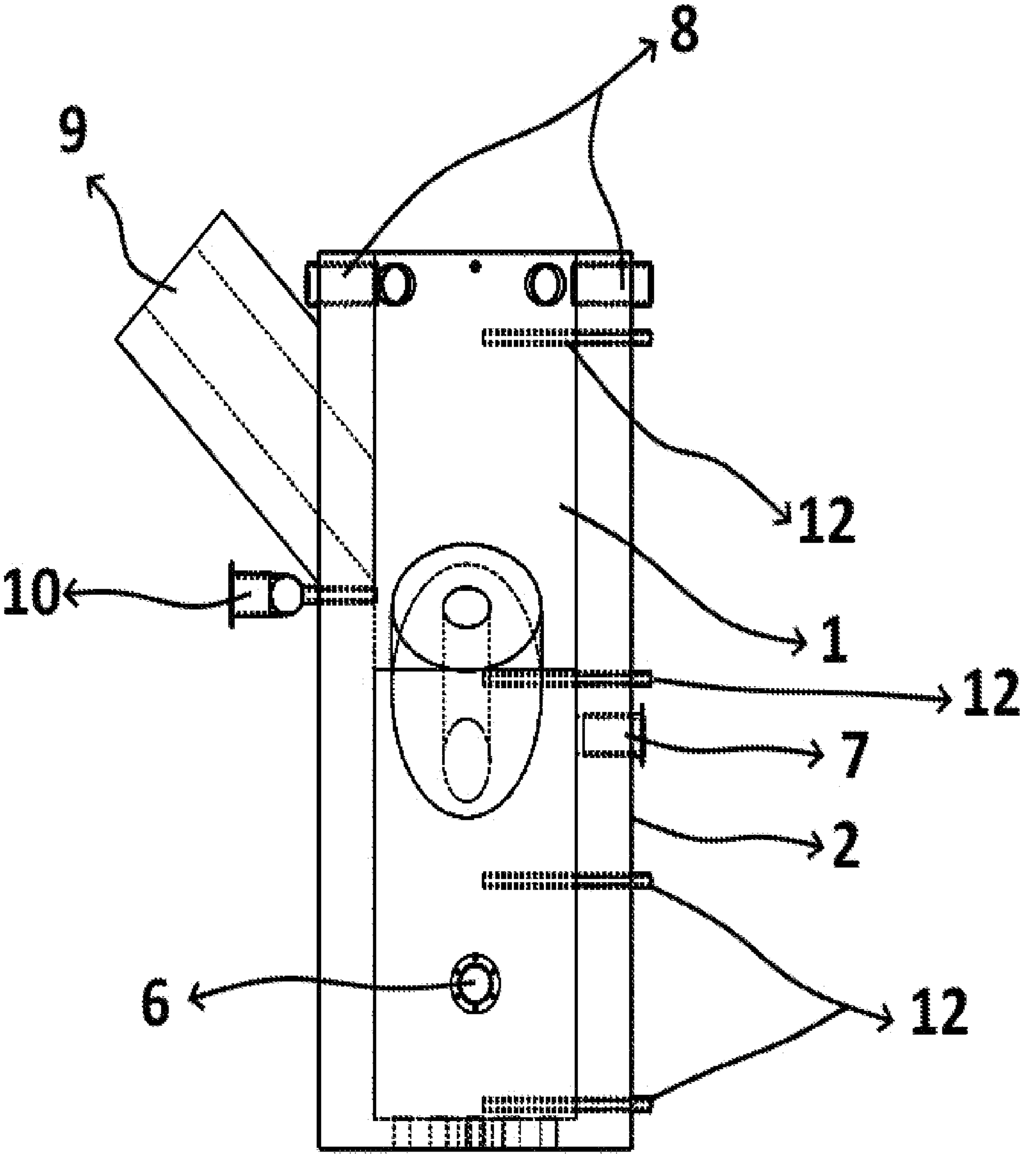
FIG. 5 is a representative cross-sectional view from the side of a one-piece refractory cast iron combustion chamber mold for a circulating fluidized bed boiler for the combustion and/or gasification of biomass, waste, lignite, and mixtures thereof, according to at least one embodiment of the invention.

The following are brief descriptions of reference numerals in the figures:

1. Inner Mold
2. Outer Mold
3. Fitting
4. Primary Stage Air Nozzle Inlets
5. Ash Removal Port
6. Biomass Feeding Point
7. Lignite Feeding Point
8. Secondary Stage Air Inlet
9. Burner Inlet
10. Burner Cooling Air Inlets
11. Seal Pot Return Inlet
12. Thermocouple Port In embodiments, the one-piece refractory cast iron combustion chamber mold for circulating fluidized bed boilers subject to the invention, which enables the combustion and/or gasification of biomass, waste, lignite and/or mixtures thereof, and the method of obtaining a combustion chamber with this mold, as well as the preferred configurations/applications thereof, are described herein in further detail, without any restrictive effect.

Figure 6:
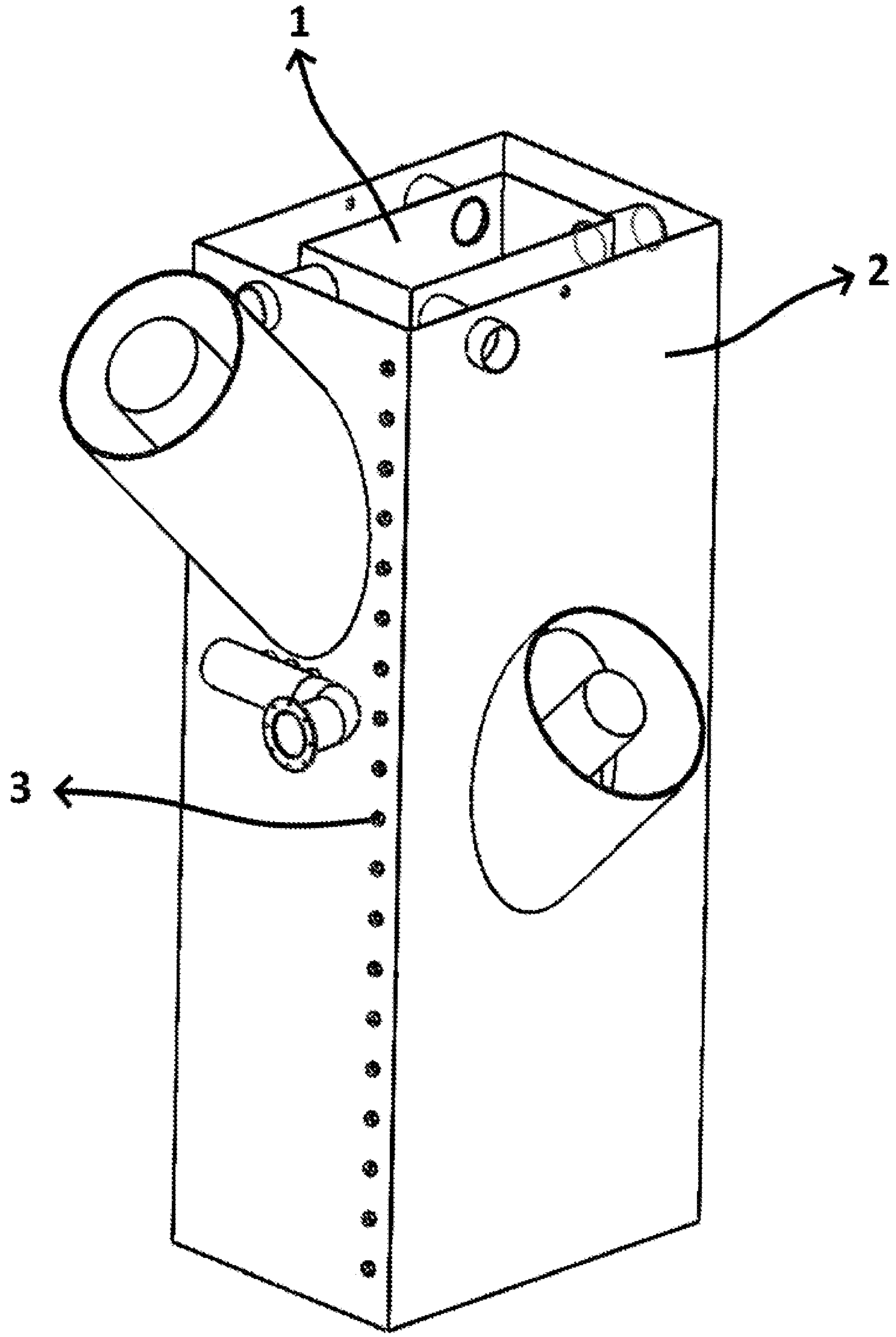
FIG. 6 is a representative side perspective view of a one-piece refractory cast iron combustion chamber mold for a circulating fluidized bed boiler for the combustion and/or gasification of biomass, waste, lignite, and mixtures thereof, according to at least one embodiment of the invention.
Figure 7:
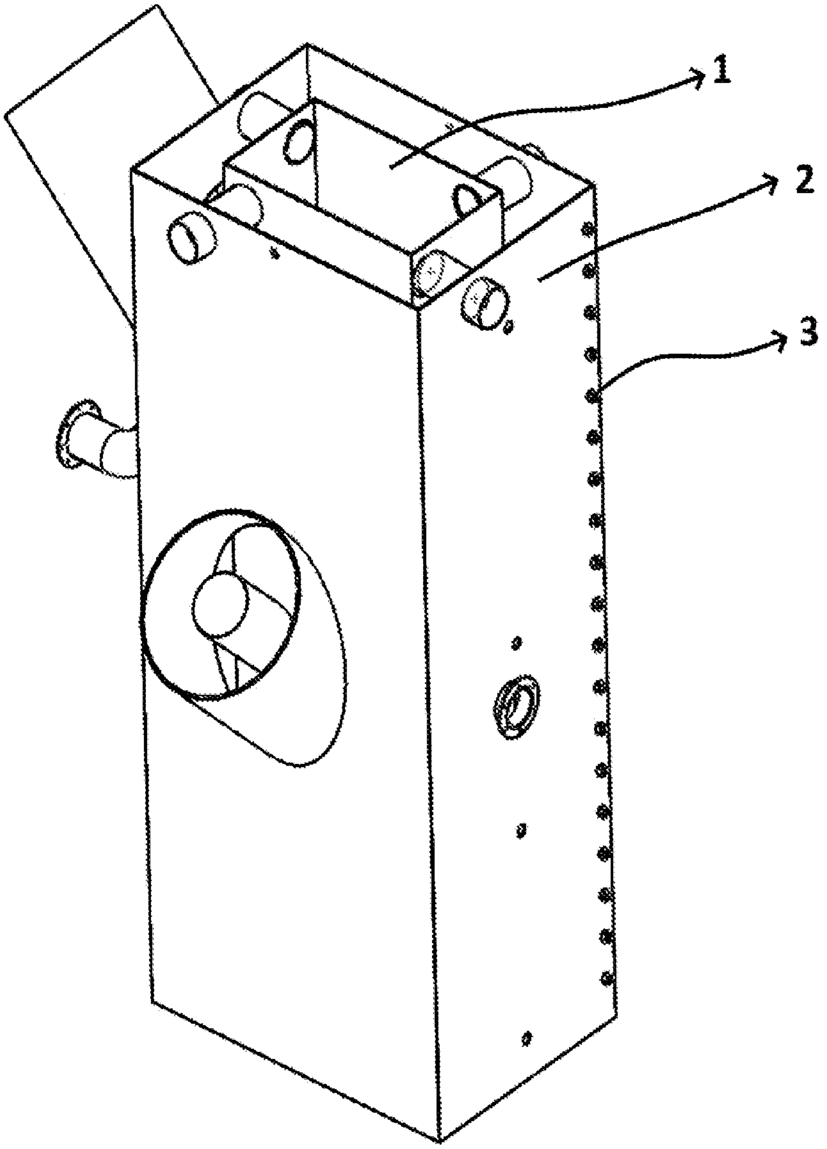
FIG. 7 is another representative side perspective view of a one-piece refractory cast iron combustion chamber mold for a circulating fluidized bed boiler for the combustion and/or gasification of biomass, waste, lignite and mixtures thereof, according to at least one embodiment of the invention.

FIG. 6 is a side perspective view of a one-piece refractory cast iron combustion chamber mold for a circulating fluidized bed boiler for the combustion and/or gasification of biomass, waste, lignite, and mixtures thereof.

The combustion chamber mold comprises a one-piece inner mold (1) forming the inner walls of the combustion chamber and a one-piece outer mold (2) surrounding said inner mold (1), forming the outer walls of the combustion chamber.

In a preferred embodiment of the invention, said inner mold (1) and outer mold (2) comprise cavities for primary stage air nozzle inlets (4) and secondary stage air inlets (8) for introducing oxygen into the combustion chamber and an ash removal inlet (5) for removing waste from the combusted fuel. In this configuration, there are also biomass feeding point (6) to receive biofuels into the combustion chamber, lignite feeding point (7) to receive lignite fuels into the combustion chamber and burner inlet (9), which is the area where the burner will be placed to ensure that the fuels in the combustion chamber are mixed with air and burnt. Said configuration may also comprise burner cooling air inlets (10) for cooling the burner by taking air from the outside, seal pot return inlet (11) for the seal pot to cool the sand without leaking back sand, and thermocouple port (12) for the thermocouple for measuring the temperature of the combustion chamber.

In a preferred embodiment of the invention, said inner mold (1) and outer mold (2) are made of sheet steel.

The combustion chamber mold comprises anchoring metals placed between said inner mold (1) and said outer mold (2) for holding the concrete when concrete is poured between said inner mold (1) and said outer mold (2) to form a combustion chamber, and a thermal insulation layer placed on the outward facing surfaces of said anchoring metals for isolating heat.

In a preferred embodiment of the invention, said thermal insulation layer is made of silica boron.

The combustion chamber mold also comprises a fitting (3) for connecting said inner mold (1) and said outer mold (2) to each other at a predetermined distance there between, and for separating said inner mold (1) and said outer mold (2) from each other when dismantled, so as to obtain a one-piece combustion chamber.

In a preferred embodiment of the invention, said fitting (3) is a bolt.

The basic configuration of the combustion chamber mold finally comprises a refractory layer, which is poured and baked between said heat insulating layer and the inner mold (1), so that the combustion chamber is temperature resistant.

In at least one embodiment of the invention, the inner mold (1) and the outer mold (2) are opened in one piece by removing the bolts, and the anchoring metals are installed, and the heat insulation layer is first placed on the back of the outer metal. Then bolts are connected, and the inner mold (1) and outer mold (2) are connected. After this stage, all holes and entrances are closed, a refractory layer is poured between the heat insulation layer and the inner mold (1), and the refractory cast iron combustion chamber with all entrances is manufactured in one piece. Thus, refractory cast iron combustion chamber of circulating fluidized bed boiler will be manufactured in desired capacities in a short time.

The method of obtaining a one-piece refractory cast iron combustion chamber for circulating fluidized bed boilers, which enables the combustion and/or gasification of biomass, waste, lignite and/or their mixtures, may comprise:

disassembling the one-piece inner mold (1) and the fitting (3), wherein the one-piece inner mold (1) forms the inner walls of the combustion chamber, and wherein the fitting (3) connects the one-piece outer mold (2), wherein the one-piece outer mold (2) forms the outer walls of the combustion chamber by wrapping around said inner mold (1), with a predetermined distance between the one-piece inner mold (1) and the one-piece outer mold (2), placing anchoring metals between the disassembled inner mold (1) and outer mold (2), placing the thermal insulation layer on the outward facing surfaces of the mentioned anchoring metals, connecting said inner mold (1) and outer mold (2) by means of fitting (3), closing all spaces of said inner mold (1) and outer mold (2) opening to the outside, pouring the refractory layer between the mentioned thermal insulation layer and the inner mold (1), pouring concrete between the mentioned inner mold (1) and outer mold (2), holding and subsequent drying of the concrete, oven drying and holding the mold to remove moisture.

In a preferred embodiment of the method of the invention, silica boron insulation material is used in the step of "placing a heat insulation layer on the outward facing surfaces of said anchoring metals".

In a preferred embodiment of the method of the invention, in the step of "holding and drying the concrete", the concrete is kept outdoors for at least 48 hours.

In a preferred embodiment of the method of the invention, in the step of "holding the mold by oven drying to remove moisture", the oven is gradually raised to 350° C. in at least 24 hours and kept at a constant temperature of 350° C. for at least 24 hours.

In a preferred embodiment of the method of the invention, in the step of "closing all spaces opening to the outside of said inner mold (1) and outer mold (2)", primary stage air nozzle inlets (4), secondary stage air inlet (8), ash removal inlet (5), biomass feeding point (6), lignite feeding point (7), burner inlet (9), burner cooling air inlets (10), seal pot return inlet (11) and thermocouple port (12) are closed.

In a preferred embodiment of the method of the invention, a high-bonded, high-temperature, high-strength and erosion-resistant fire refractory with cement can be cast together between the inner mold (1) and the thermal insulation layer.

Thus, a one-piece refractory cast refractory combustion chamber mold and a method of obtaining a combustion chamber from this mold, which enables the combustion and/or gasification of biomass, waste, lignite and/or their mixtures for circulating fluidized bed boilers, are presented.

The invention claimed is:

1. A single-piece refractory cast combustion chamber mold for circulating fluidized bed boilers that provides the combustion and/or gasification of biomass, waste, lignite, and/or mixtures thereof, comprising:

at least one inner mold in one-piece, for forming inner walls of the combustion chamber, at least one outer mold in one-piece, for forming outer walls of the combustion chamber by wrapping around the at least one inner mold, anchoring metals that are placed between the at least one inner mold and the at least one outer mold such that concrete is held when the concrete is poured to obtain a combustion chamber between the at least one inner mold and the at least one outer mold, a thermal insulation layer placed on the outer facing surfaces of the anchoring metals to isolate heat, at least one fitting which enables the at least one inner mold and the at least one outer mold to be connected to each other at a predetermined distance from each other and, when removed, enables the at least one inner mold and the at least one outer mold to be separated from each other to obtain the combustion chamber, and a refractory layer that is poured and oven-dried between the thermal insulation layer and the at least one inner mold to make the combustion chamber resistant to temperature.

2. The combustion chamber mold according to claim 1, wherein the at least one inner mold and the at least one outer mold comprises:

primary stage air nozzle inlets and a secondary stage air inlet to allow oxygen to enter the combustion chamber, an ash removal part to allow the waste from burned fuel to be removed to the outside, a biomass feeding point to allow intake of biofuels into the combustion chamber, a lignite feeding point to allow lignite fuels to be taken into the combustion chamber, a burner inlet area where a burner is placed such that fuels in the combustion chamber are mixed with air and burned, burner cooling air inlets to cool the burner by taking in air from the outside, a seal pot return inlet area where a seal pot is placed to cool sand without the sand leaking backwards, and a thermocouple port area where a thermocouple is placed to measure a temperature of the combustion chamber.

3. The combustion chamber mold according to claim 1, wherein the at least one fitting is a bolt.

4. The combustion chamber mold according to claim 1, wherein the at least one inner mold and the at least one outer mold are made of sheet steel.

5. The combustion chamber mold according to claim 1, wherein the thermal insulation layer is made of silica boron.

6. A method of obtaining a one-piece refractory cast iron combustion chamber for circulating fluidized bed boilers, enabling the combustion and/or gasification of biomass, waste, lignite, and/or mixtures thereof, the method comprising:

disassembling a one-piece inner mold for forming inner walls of a combustion chamber, and a fitting for connecting a one-piece outer mold for forming outer walls of the combustion chamber by wrapping around the one-piece inner mold, with a predetermined distance in-between, placing anchoring metals between the disassembled one-piece inner mold and one-piece outer mold, placing a thermal insulation layer on outer facing surfaces of the anchoring metals, connecting the one-piece inner mold and the one-piece outer mold are connected with the fitting, closing all spaces of the one-piece inner mold and the one-piece outer mold that open to the outside, pouring a refractory layer between the thermal insulation layer and the one-piece inner mold, pouring concrete between the one-piece inner mold and the one-piece outer mold, holding and drying the concrete, and oven drying and holding the mold to remove moisture.

7. The method of obtaining a combustion chamber according to claim 6, wherein the placing the thermal insulation layer further comprises using a silica boron insulating material.

8. The method of obtaining a combustion chamber according to claim 6, wherein the holding and drying of the concrete further comprises holding the concrete outdoors for at least 48 hours.

9. The method of obtaining a combustion chamber according to claim 6, wherein the oven drying and holding the mold to further comprises:

gradually raising a temperature of the oven to 350° C. over at least 24 hours, and holding the mold in the oven at a constant temperature of 350° C. for at least 24 hours.

10. The method of obtaining a combustion chamber according to claim 6, wherein the closing all spaces further comprises closing primary stage air nozzle inlets, a secondary stage air inlet, an ash removal part, a biomass feeding point, a lignite feeding point, a burner inlet-, burner cooling air inlets, a seal pot return inlet, and a thermocouple port.

* * * * *